US 6,705,511 B1

(12) United States Patent
Dames et al.

(10) Patent No.: US 6,705,511 B1
(45) Date of Patent: Mar. 16, 2004

(54) TRANSDUCER AND METHOD OF MANUFACTURE (75) Inventors: Andrew N. Dames, Cambridge (GB); David T. E. Ely, Horston (GB)

(73) Assignee: Synaptics (UK) Limited, Cambridgeshire (GB)

(*) Notice: Subject to any disclaimer, the term of this patent is extended or adjusted under 35 U.S.C. 154(b) by 0 days.

(21) Appl. No.: 09/424,706

(22) PCT Filed: May 28, 1998

(86) PCT No.: PCT/GB98/01557

§ 371 (c)(1),
(2), (4) Date: Nov. 29, 1999

(87) PCT Pub. No.: WO98/54545

PCT Pub. Date: Dec. 3, 1998

(30) Foreign Application Priority Data

May 28, 1997 (GB) ............................... 9710988
Mar. 3, 1998 (GB) ............................... 9804525

(51) Int. Cl.⁷ .......................... B23K 31/00; B23K 31/02
(52) U.S. Cl. ................................................. 228/180.5
(58) Field of Search .......................... 228/180.5, 179.1, 228/178, 110.1, 111.5

(56) References Cited

U.S. PATENT DOCUMENTS

| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |
| 3,482,242 A | 12/1969 | Hargrove |
| 3,647,963 A | 3/1972 | Bailey |
| 3,772,587 A | 11/1973 | Ferrand et al. |
| 3,812,481 A | 5/1974 | Stednitz |
| 3,851,242 A | 11/1974 | Ellis |
| 3,895,356 A | 7/1975 | Kraus |
| 3,898,635 A | 8/1975 | Kulterman |
| 3,906,436 A | 9/1975 | Kurauchi et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |

(List continued on next page.)

FOREIGN PATENT DOCUMENTS

| DE | 1134848 | 8/1962 |
| DE | 3500121 A1 | 7/1986 |
| DE | 3620412 A1 | 12/1987 |

(List continued on next page.)

OTHER PUBLICATIONS

Patent Abstracts of Japan, vol. 010, No. 009, (P–420), Jan. 14, 1986 & JP 60 165512A (Toshiba KK), Aug. 28, 1985.
Klatt, "Phase of Digital Data Fixes Shaft Angle", Electrical Design News, vol. 16, No. 12, Jun. 15, 1971, pp. 53–56, XP002045871.
Electronics Letters, vol. 11, No. 1, Jan. 9, 1975, pp. 5–6, Gordon, Digital xy Position Indicator Using Walsh Functions.

(List continued on next page.)

*Primary Examiner*—M. Alexandra Elve
*Assistant Examiner*—Colleen P. Cooke
(74) *Attorney, Agent, or Firm*—Nixon & Vanderhye P.C.

(57) ABSTRACT

A method of manufacturing a transducer used in sensing or generating magnetic fields in a position detector wherein the transducer has a substrate and a conductor fixed to the substrate in a predetermined pattern. A wire laying device controllably lays wire onto the substrate so as to form the predetermined pattern. Relative movement is caused between the laying device and the substrate, and the wire is bonded to the substrate as it is laid thereon.

37 Claims, 6 Drawing Sheets

U.S. PATENT DOCUMENTS

| | | |
|---|---|---|
| 4,097,684 A | 6/1978 | Burr |
| 4,150,352 A | 4/1979 | Pomella et al. |
| 4,156,192 A | 5/1979 | Schedrovitsky et al. |
| 4,210,775 A | 7/1980 | Rodgers et al. |
| 4,223,300 A | 9/1980 | Wiklund |
| 4,255,617 A | 3/1981 | Carau, Sr. et al. |
| 4,341,385 A | 7/1982 | Doyle et al. |
| 4,387,509 A * | 6/1983 | Dechelette .................. 29/850 |
| 4,423,286 A | 12/1983 | Bergeron |
| 4,425,511 A | 1/1984 | Brosh |
| 4,482,784 A | 11/1984 | Whetstone |
| 4,504,832 A | 3/1985 | Conte |
| 4,507,638 A | 3/1985 | Brosh |
| 4,532,376 A | 7/1985 | Rockwell |
| 4,577,057 A | 3/1986 | Blesser |
| 4,593,245 A | 6/1986 | Viertl et al. |
| 4,609,776 A | 9/1986 | Murakami et al. |
| 4,642,321 A | 2/1987 | Schoenberg et al. |
| 4,693,778 A | 9/1987 | Swiggett et al. |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett et al. |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,786,765 A | 11/1988 | Yamanami et al. |
| 4,820,961 A | 4/1989 | McMullin |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips |
| 4,975,546 A | 12/1990 | Craig |
| 4,985,691 A | 1/1991 | Pulyer et al. |
| 4,999,461 A | 3/1991 | Murakami et al. |
| 5,013,047 A | 5/1991 | Schwab |
| 5,028,745 A | 7/1991 | Yamanami et al. |
| 5,041,785 A | 8/1991 | Bogaerts et al. |
| 5,082,286 A | 1/1992 | Ryan et al. |
| 5,088,928 A | 2/1992 | Chan |
| 5,129,654 A | 7/1992 | Bogner |
| 5,136,125 A | 8/1992 | Russell |
| 5,177,389 A | 1/1993 | Schalk |
| 5,188,368 A | 2/1993 | Ryan |
| 5,381,091 A | 1/1995 | Kobayashi et al. |
| 5,406,155 A | 4/1995 | Persson |
| 5,434,372 A | 7/1995 | Lin |
| 5,486,731 A | 1/1996 | Masaki et al. |
| 5,619,431 A | 4/1997 | Oda |
| 5,625,239 A | 4/1997 | Persson et al. |
| 4,878,553 A | 9/1997 | Yamanami et al. |
| 5,693,993 A | 12/1997 | Ito et al. |
| 5,748,110 A | 5/1998 | Sekizawa |
| 5,783,940 A | 7/1998 | Kolomeitsev |
| 5,815,091 A | 9/1998 | Dames |
| 5,826,473 A * | 10/1998 | Saka et al. ..................... 83/100 |
| 5,866,847 A * | 2/1999 | Saka et al. ................. 174/68.1 |
| 5,914,735 A * | 6/1999 | Yamamoto et al. ........... 347/33 |
| 6,124,708 A | 9/2000 | Dames |

FOREIGN PATENT DOCUMENTS

| | | |
|---|---|---|
| EP | 0159191 A2 | 10/1985 |
| EP | 0182085 A2 | 5/1986 |
| EP | 0182085 A3 | 5/1986 |
| EP | 0209513 A1 | 6/1986 |
| EP | 0218745 | 4/1987 |
| EP | 0313046 | 4/1989 |
| EP | 0537458 | 4/1993 |
| EP | 0552001 A1 | 7/1993 |
| EP | 0554900 | 8/1993 |
| EP | 0607694 A1 | 7/1994 |
| EP | 0 657 917 A1 | 6/1995 |
| EP | 0 675 581 A1 | 10/1995 |
| EP | 0680009 | 11/1995 |
| EP | 0 709 648 A2 | 5/1996 |
| EP | 0716390 | 6/1996 |
| EP | 0743508 A2 | 11/1996 |
| EP | 0772149 | 5/1997 |
| FR | 1325017 | 3/1962 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2 042 183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2 141 235 A | 12/1984 |
| WO | WO 92/12401 | 7/1992 |
| WO | WO 94/25829 | 11/1994 |
| WO | 95/31696 | 11/1995 |
| WO | WO 95/31696 | 11/1995 |
| WO | WO 96/03188 A1 | 2/1996 |
| WO | 97/14935 | 4/1997 |
| WO | WO 98/00921 | 1/1998 |

OTHER PUBLICATIONS

Pulle et al, "A New Magnetoresistive Based Sensor for Switched Reluctance Drives" Proceedings of the Annual Power Electronics Specialists Conference (PECS), Toledo, Jun. 29–Jul. 3, 1992, vol. 2, No. Conf, 23, Jun. 29, 1992, pp. 839–843, Institute of Electrical and Electronics Engineers.

Patent Abstracts of Japan, vol. 15, No. 37 (P–1159), Jan. 29, 1991 & JP 02 0275314 A (Omron Tateisi Electron Co), Nov. 9, 1990.

Patent Abstracts of Japan, vol. 10, No. 32 (E–379), Feb. 7, 1986 & JP 60 189231 A (Matsushita Denki Sangyo KK), Sep. 26, 1985.

McDonnel, "The Use of Inductosyn to Digital Converters in Linear Control Systems", Automation, vol. 10, No. 11–12, Nov. 1975–Dec. 1975, pp. 31–32.

* cited by examiner

TRANSDUCER AND METHOD OF MANUFACTURE

BACKGROUND OF THE INVENTION

The present invention relates to transducers for use in inductive position sensors and to methods for their manufacture. The present invention has particular although not exclusive relevance to the manufacture of conductive tracks for sensing or for generating magnetic fields for use in an inductive position sensor using wire bonding technology.

Many types of non contact linear and rotary position encoders have been proposed for generating signals indicative of the position of two relatively movable members. Typically, one of the members carries one or more sensor coils and the other carries one or more magnetic field generators. The magnetic field generators and the sensor coils are arranged such that the amount of magnetic coupling between them varies as a function of the relative position between the two members. This can be achieved by, for example, designing the sensor coils so that their sensitivity to magnetic field varies in a predetermined manner along the measurement path. Alternatively, the magnetic field generators can be designed so that the magnetic field which they generate varies in a predetermined manner along the measurement path.

One example of this type of position encoder is the Inductosyn, which comprises a contactless slider which is arranged to detect the field generated by a fixed track, or vice versa. The fixed track comprises a repeating pattern of conductors which generate a magnetic field of substantially sinusoidal variation in the measurement direction when a current is applied to them. This magnetic field is detected by the moving slider, which comprises sin and cos detector tracks. The position of the two relatively movable members is then determined from the spatial phase of the signals detected by these two detector tracks.

The applicant has proposed in its earlier International Application WO95/31696, a similar type of position encoder in which one member carries an excitation coil and a number of sensor coils and the other member carries a resonator. In operation, the excitation coil energises the resonator which induces signals in the sensor coils which sinusoidally vary with the relative position between the two members.

In both these prior art systems, in order for the output signals to accurately reflect the relative position between the two members, the sensor coils and/or the magnetic field generators must be accurately positioned on the respective members.

Most commercial systems to date either employ screen printing technology using conductive inks or printed circuit board (PCB) technology, to create the sensor coils and/or the magnetic field generators. However, the screen printing technique suffers from the disadvantage that the tracks produced have a relatively high resistance (as compared with those produced by the PCB technology) resulting in either low output signal levels if the tracks are for sensing magnetic fields, or the necessity of large transmitting powers in order to generate the required strength of magnetic field if the tracks are for generating magnetic fields. Although the tracks produced using the PCB technology have a lower resistance than those of the screen printed inks, PCB technology suffers from a number of disadvantages, including:

i) existing PCB processing techniques are predominantly batch based with maximum board dimensions of approximately 0.6 m;

ii) existing PCB techniques typically employ multiple layers with through connections (vias) which are difficult to manufacture, especially with long tracks, because their manufacture typically requires stationary batch-based processing;

iii) positional errors are generated in the output signals, because the conductors do not lie on a single layer but on two or more separate layers.

U.S. Pat. No. 5,625,239 discloses a position encoder for use in determining the relative position between a rotor and a stator, wherein the rotor carries a transmitter coil made from wire which is laid in a groove and then secured by means of an adhesive. However, this technique requires the manufacture of precise grooves around the rotor and is therefore expensive to make.

SUMMARY OF THE INVENTION

One aim of the present invention is to provide an alternative method of manufacturing sensor coils and/or magnetic field generators for use in position sensors.

According to one aspect, the present invention provides a method of manufacturing a transducer for use in sensing or generating magnetic fields which employs wire bonding technology to lay the conductor tracks on a substrate in the required shape. This has the benefits of low cost, accuracy and simplicity and the potential for easily making long lengths or awkward shapes of transducer.

According to another aspect, the present invention provides a method of manufacturing a transducer for use in a position encoder, the method comprising the steps of: providing a wire laying device for controllably laying a wire onto a substrate; causing the laying device to lay the wire on the substrate in a desired pattern by causing the relative movement between the laying device and the substrate; and bonding the wire to the substrate. Preferably, the wire is bonded to the substrate whilst it is being laid, since this improves the laying accuracy.

The method described above is ideally suited to manufacturing long (typically >0.6 m) lengths of transducer because the substrate can be continuously moved or stepped past the laying device. In contrast, with the prior art techniques, in order to make long length tracks, they are either made in sections and then subsequently joined together or they are stretched to the required length. However, both techniques are expensive, time consuming and require significant skill to align the sections properly or to ensure the stretched track has the required shape.

Preferably the substrate comprises a rigid steel support for providing mechanical stability to the substrate. In this case, in order to allow a low profile transducer to be manufactured, a layer of magnetically soft material is preferably disposed between the steel base layer and the wires, since such a magnetically soft layer enhances performance by providing a permeable path for magnetic flux to pass behind the wires. The magnetically soft layer may comprise a flexible plastic or rubber layer containing ferrite or iron powder.

Where the scale is required in lengths in excess of 2 m, the scale is preferably flexible so that it can be coiled up for ease of transportation and storage. In this case, the substrate preferably comprises a flexible yet stable support such as spring steel which has substantial linear stability when made flat after being coiled up.

Although the wires can be glued to the substrate, ultrasonic or heat bonding is preferably used since the position can be fixed almost instantaneously, so that the placement of the wire can occur at the same time as its position is fixed.

Preferably the wire bonding machine comprises a sensor for detecting the height of the wire bonding head relative to the substrate in order to control the bonding pressure and to be able to accommodate different substrate thicknesses. Preferably, the wire bonding machine also comprises means for terminating the wires (for example by welding them onto terminals) and lamination means for laminating a protective upper layer over the wires for protection and so that further layers of wires can be laminated on top, for example, so that the transducer can be used in an absolute position encoder.

According to another aspect, the present invention provides a method of manufacturing a transducer for use in a position detector, the method comprising the steps of providing a wire laying device for controllably laying a wire onto a substrate causing the laying device to lay the wire on the substrate in a desired pattern by (i) sensing the current position of the wire laying device relative to the substrate; (ii) comparing said current position with an expected position derived from said desired pattern; and (iii) controlling the relative movement between said wire laying device and said substrate in dependence upon the result of said comparison step and bonding the wire to the substrate to form the desired pattern.

The present invention also provides a position detector comprising first and second members mounted for relative movement along a measuring path said first member, comprising a magnetic field generator for generating a magnetic field along said measuring path said second member comprising a magnetic field sensor for sensing the magnetic field generated by said magnetic field generator and for outputting an output signal, said magnetic field sensor and said magnetic field generator being arranged so that said output signal varies as a function of the relative position of said two members along said path characterised in that at least one of said magnetic field generator and said magnetic field sensor comprises a transducer manufactured using the above described method.

The present invention also provides a transducer for use in sensing or generating magnetic fields in a position detector, the transducer comprising a substrate and at least one wire bonded onto the substrate in a desired pattern using the above described method.

According to another aspect, the present invention provides a transducer for use in a position detector, the transducer comprising a substrate; a first layer of wire bonded onto the substrate in a desired pattern; an insulating layer positioned on said first layer of wire; and a second layer of wire bonded onto said insulating layer in a desired pattern.

According to another aspect, the present invention provides a wire bonding apparatus for manufacturing a transducer for use in sensing or generating magnetic fields in a position detector, the wire bonding apparatus comprising a wire laying device for controllably laying a wire onto a substrate; means for sensing the current position of the wire laying device relative to the substrate; means for comparing the current position with an expected position derived from said desired pattern; controlling means for controlling the relative movement between said wire laying device and said substrate in dependence upon the output of said comparison means; and bonding means for bonding the wire to the substrate in the desired pattern.

According to another aspect, the present invention provides a transducer for use in sensing or generating magnetic fields in a position sensor, the transducer comprising a layer of at least one conductor for sensing or for generating magnetic fields; and a layer of soft magnetic material located behind said conductor layer for providing a permeable path for magnetic flux to pass behind the conductor layer.

BRIEF DESCRIPTION OF DRAWINGS

Exemplary embodiments of the invention will now be described with reference to the accompanying drawings in which:

FIG. 3b is an end view of the substrate shown in FIG. 3a;

FIG. 4b illustrates the form of a first wire which forms part of the pattern shown in FIG. 4a;

FIG. 4c illustrates the form of a second wire which forms part of the pattern shown in FIG. 4a;

FIG. 4d illustrates the form of a third wire which forms part of the pattern shown in FIG. 4a;

FIG. 4e illustrates the form of a fourth wire which forms part of the pattern shown in FIG. 4a;

Wire bonding is a relatively well known technique in the art of printed circuit board manufacture. It is widely used to connect integrated circuits to their lead frames. In this case; the conductors are held in place at their ends and not at intermediate positions, because the positioning is not critical and distances are short. Wire bonding has also been used to manufacture complex circuit boards for use in, for example, military applications. In this case, the wires (typically having a diameter of about 0.1 mm to 0.5 mm) are usually made from enamelled copper, so that they can cross in the same layer without short circuiting. They are bonded on to the surface of a plastic substrate by the application of ultrasonic energy. Bonding is performed along substantially the whole length of the wires for maximum stability. This technology has been developed by, among others, Advanced Interconnection Technology of Islip, Long Island, N.Y., USA. The technique has existed for at least twenty years. However, to date wire bonding technology has not been used for accurately positioning and attaching conductors to a substrate for use as magnetic field generators/sensors in a position sensor.

Figure 1:
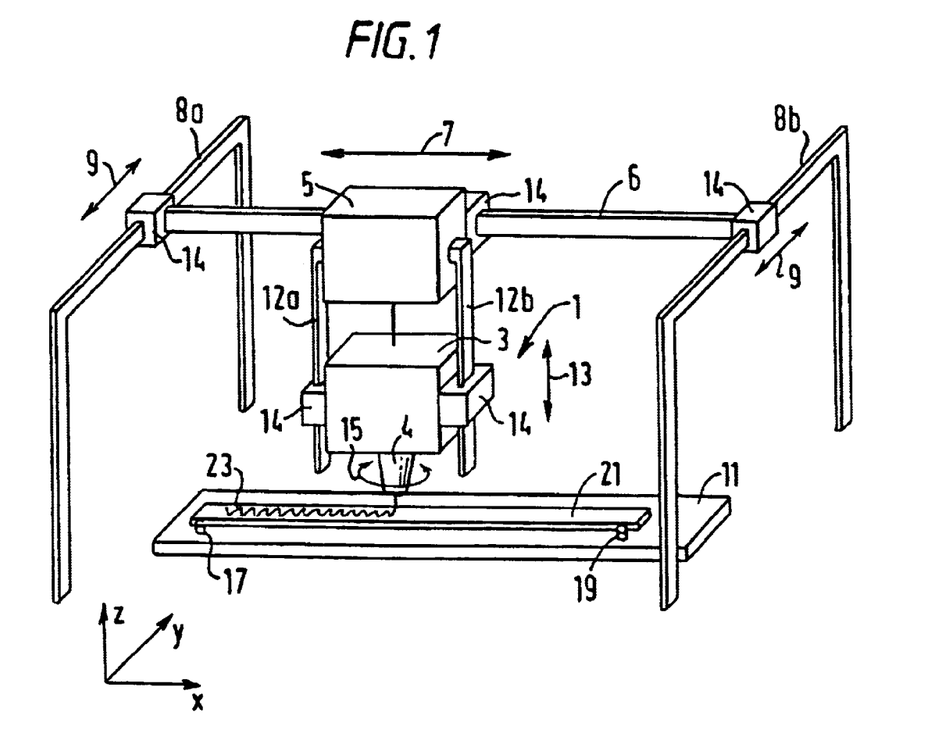
FIG. 1 schematically illustrates an apparatus which uses wire bonding technology for laying conductive tracks on a substrate for use in a position sensor.

FIG. 1 illustrates a wire bonding apparatus 1 having a wire bonding head 3 and a wire dispenser and tensioning unit 5. The general principle of operation of such wire bonding apparatus is described in, for example, U.S. Pat. No. 4,693,778, the contents of which are incorporated herein by reference. In this embodiment, both the bonding head 3 and the dispenser and tensioning unit 5 are mounted together on a supporting frame so that they are movable in the X and Y directions. More specifically, the supporting frame comprises two fixed end rails 8a and 8b which extend in the Y direction and a moveable supporting rail 6 which extends in the X direction and which is supported by the end rails 8a and 8b. As represented by double headed arrows 9, the supporting rail 6 is moveable in the Y direction along the end rails 8a and 8b. The wire dispenser and tensioning unit 5 is mounted on the support rail 6 and is moveable along the rail 6 in the X direction, as represented by double headed arrow 7. The wire bonding head 3 is carried by the wire dispenser and tensioning unit 5 via the rails 12a and 12b which extend in the Z direction. As represented by double-headed arrow 13, the wire bonding head 3 is moveable up and down the rails 12a and 12b in the Z direction, relative to the wire dispenser and tensioning unit 5. The movement of the wire dispenser and tensioning unit 5 and the wire bonding head 3 in the X and Y directions and the movement of the wire bonding head 3 in the Z direction relative to the wire dispenser and tensioning unit 5 is controlled by servo motors 14. In this embodiment, the tip 4 of the wire bonding head 3 is rotatable about its longitudinal axis (which is parallel to the Z axis) so that the direction of wire placement on the substrate, relative to the tip 4, is constant, thereby allowing a more accurate placement of the wire onto the substrate.

In operation, the substrate 21 is firstly secured to the machine bed 11 with securing pins 17 and 19. Then the wire bonding head 3 is moved to a home position, at the left hand end of the substrate 21, where the laying of wire 23 is commenced by bonding the end of the wire 23 onto the substrate at the required position. In this embodiment, the wire bonding head 3 uses an ultrasonic bonding technique to bond the wire 23 to the substrate 21. Ultrasonic bonding is preferred because the wire may be fixed in position almost instantaneously, so that the placement of the wire can occur at the same time as its position is fixed. In particular, as the wire 23 is placed onto the substrate 21, the bonding head 3 applies a light pressure and simultaneously applies ultrasonic motion to the upper surface of the wire 23 with its lower surface in contact with the substrate. The ultrasonic energy is absorbed by the substrate 21 where it contacts the wire 23, causing it to heat and melt at this position, subsequently forming a bond when it resolidifies as it cools. Since the ultrasonic energy decreases rapidly with distance from where it is applied to the wire, the bonding process can be controlled so that only the part of the plastic substrate 21 nearest to the bonding head 3 is melted. The ultrasonic motion will be between 5 KHz and 200 KHz but will typically be a few tens of KHz and the power level of the ultrasonic energy will be between 1 watt and 200 watts, depending on the thermoplastic substrate used and the speed of movement of the bonding head 3 over the substrate 21.

The required pattern is then laid on the track by moving the bonding head 3 relative to the substrate 21 and bonding the wire where necessary. In order to secure the wire to the substrate in the required pattern, the wire must be bonded at least whenever there is a change of direction. However, in this embodiment, bonding is performed substantially along the entire length of the wire 23 for maximum stability. Once the required pattern of wire has been laid on the substrate 21, the end of the wire is cropped, using a cropping device (not shown) located in the tip 4 of the wire bonding head 3, and terminated by, for example, welding it to a terminal. If the desired pattern requires more than one wire to be laid on the substrate, then the above procedure is repeated.

Additionally, if the desired pattern is such that some of the wires cross, then either enamelled wire is used to avoid short circuits at the crossover points, or two or more layers of bare wire are used with through connections where required.

In order to accurately place the wire on the substrate, a number of position sensors are used which monitor the current position (x, y, z) of the wire bonding head 3 together with a rotary sensor which senses the rotational angle ($\theta$) of the tip 4. Where a high precision transducer is to be manufactured with a scale accuracy of approximately 1 $\mu$m, the placement accuracy of the wire bonding head should be at least 1 $\mu$m. This is because there is usually a large degree of averaging with an inductive sensor which employs a repeating periodic pattern of conductors, so that the wire placement accuracy need not greatly exceed system accuracy, provided that any errors in the wire placement are random or non-cumulative.

Figure 2:
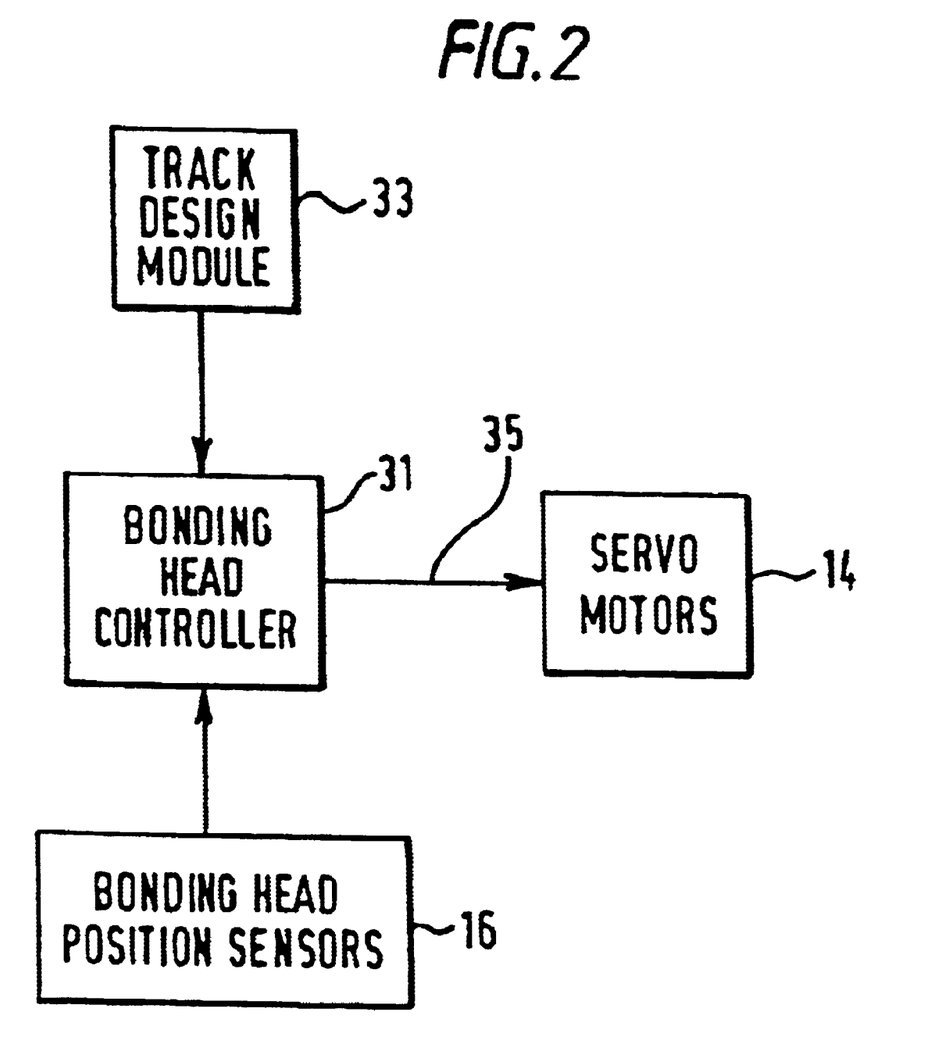
FIG. 2 is a block diagram of a control system used to control the position of the wire bonding head forming part of the apparatus shown in FIG. 1.

FIG. 2 is a block diagram of the control circuitry used to control the position (x,y,z) of the head 3 and the rotation ($\theta$) of the tip 4. As shown, the control circuitry comprises bonding head position sensors 16 which sense the current position (x, y, z) of the wire bonding head 3 and the angular rotation ($\theta$) of the tip 4 relative to the wire bonding head 3. These position sensors are mounted on the respective frame supports and next to the rotatable tip 4. The control of the movement of the bonding head 3 in the X and the Y directions is more critical to wire placement than the control of the movement of the bonding head 3 in the Z direction or the control of the rotation of the tip 4. Consequently, in this embodiment, stabilised optical interferometers are used to sense the current X and Y position of the bonding head 3.

The signals output from the position sensors 16 are passed to the controller 31, which compares the current position (x, y, z) and the current angular rotation ($\theta$) with the desired position and the desired rotation output from a track design module 33. Based on the difference between the sensed position and rotation angle and the desired position and rotation angle, the controller 31 outputs control signals 35 for controlling the servo motors 14 which move the wire dispenser and tensioning unit 5 and the wire bonding head 3 and which rotate the tip 4 so that the desired pattern of wire is laid on the substrate.

Figure 3A:
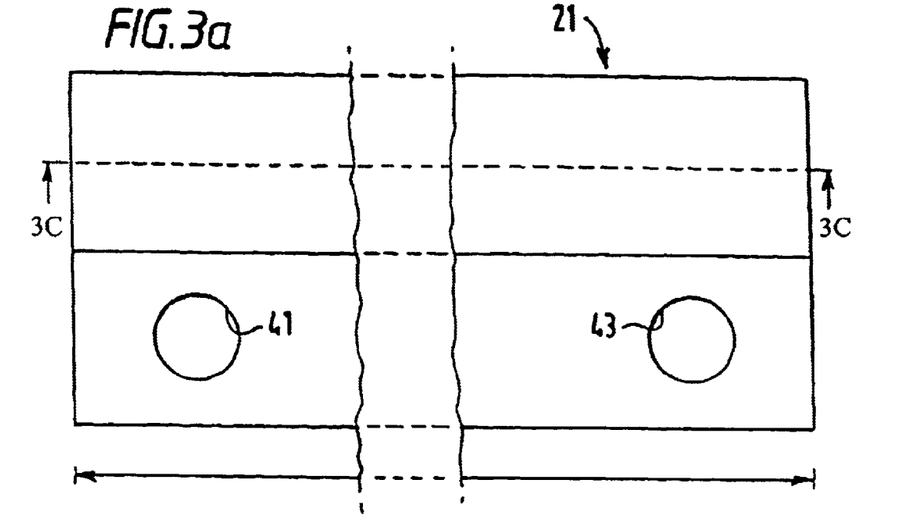
FIG. 3a is a plan view of a substrate after the apparatus shown in FIG. 1 laid the conductive tracks.
Figure 3B:
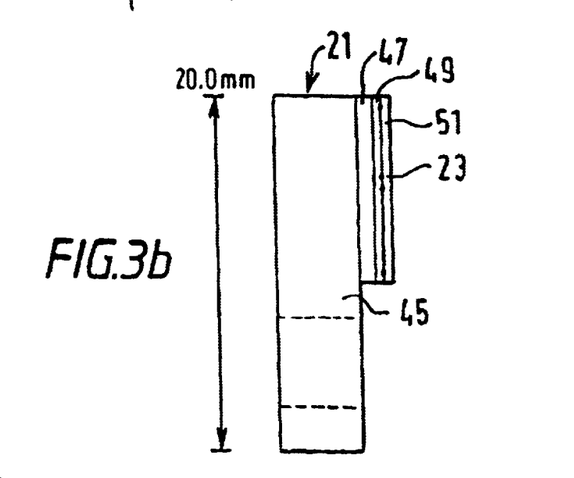

FIG. 3a is a plan view of the substrate 21. As shown, the substrate 21 comprises two mounting holes 41 and 43 for allowing the substrate 21 to be secured to the machine bed 11 by the securing pins 17 and 19 during the manufacturing process and for allowing the substrate 21 to be secured in place during normal use. FIG. 3b shows an end view of the substrate 21 and FIG. 3c shows a sectional view of the substrate 21 through line 3C—3C shown in FIG. 3a after the wire has been laid thereon.

Figure 3C:
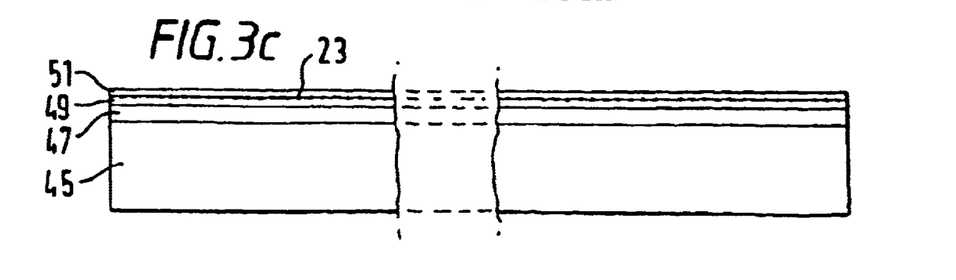
FIG. 3c is a cross-sectional view of the substrate shown in FIG. 3a taken through the line 3C—3C.

As shown in FIGS. 3b and 3c, the substrate 21 comprises a number of layers. Layer 45 is provided to give the substrate 21 mechanical strength and in this embodiment is 5 mm thick and made of steel. Layer 47 is made from a magnetically soft material and is provided in order to reduce any disturbance which would be caused by the steel base layer 45. This is because the steel base layer 45 repels high frequency (greater than about 20 KHz) magnetic fields, thereby reducing signal levels detected in the sensor wires. The magnetically soft layer 47 therefore effectively shields the steel base layer 45 and enhances the performance by providing a permeable path for magnetic flux to pass behind the wires 23 and allows a low profile scale to be made, since without it the distance between the wires and the base layer would have to be greater in order to reduce the effects of this interference caused by the base layer 45. The magnetically soft layer is preferably between 0.5 mm and 3 mm thick so that it is flexible. The layer 47 may be made, for example, from plastic or rubber containing iron or ferrite powder, although any magnetically soft material may be used. In this embodiment, the magnetically soft layer is 1 mm thick and comprises rubber containing 80% by volume of ferrite powder. In this embodiment a softenable layer 49 which can receive and bond to the wires 23 is provided on the magnetically soft layer 47. In this embodiment, this bonding layer 49 is 0.5 mm thick and made of a thermoplastic material, such as PVC, which is suited to ultrasonic bonding. Finally, a protective layer 51 is placed over the wires 23 in order to protect them from damage and to further secure them in place. In this embodiment, the protective layer 51 is 0.5 mm thick and made from a high durability plastic.

As those skilled in the art will appreciate, there are many different wire track patterns which can be used in a position sensor and the above described wire bonding machine can be used to make most, if not all, of them. WO 95/31696 and UK 2042183 illustrate some of the different kinds of track patterns which can be used in a position sensor. A description will now be given with reference to FIG. 4 of a track pattern similar to those described in WO 95/31696 which is suited to high precision (approximately ±1 μm) position measurement. The design illustrated in FIG. 4a extends to 21 inches (533 mm), but could be used for significantly greater lengths as well. The design comprises two quadrature periodic windings 56 and 58, each comprising a plurality of alternate, sense loops. In this embodiment, the tracks lie on one layer and are made from enamelled copper wire to avoid short circuits at the crossover points. In this embodiment, the period (or scale pitch) $T_s$ of the track is 0.2 inches (5.08 mm) and the height 62 is 0.5 inches (13 mm).

Figure 4A:
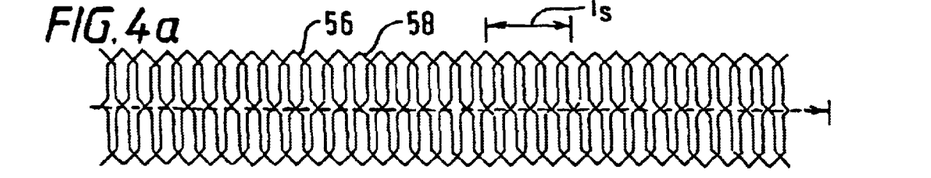
FIG. 4a illustrates an example wire pattern which the apparatus shown in FIG. 1 can lay on the substrate.
Figure 4B:
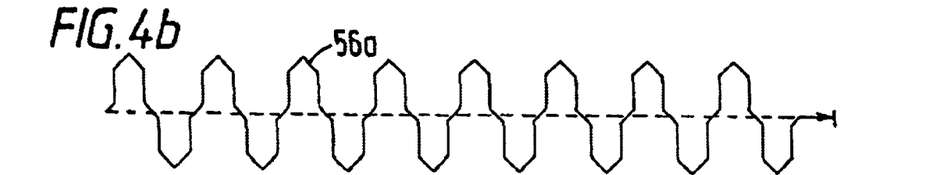
Figure 4C:
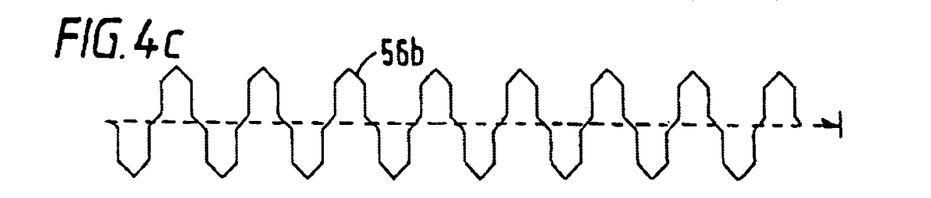
Figure 4D:
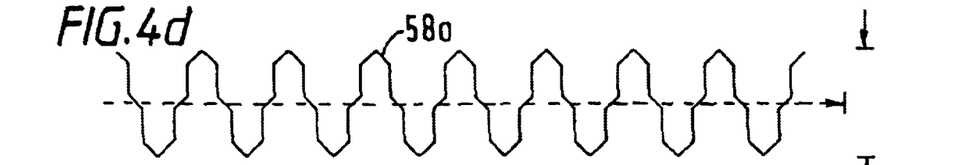
Figure 4E:
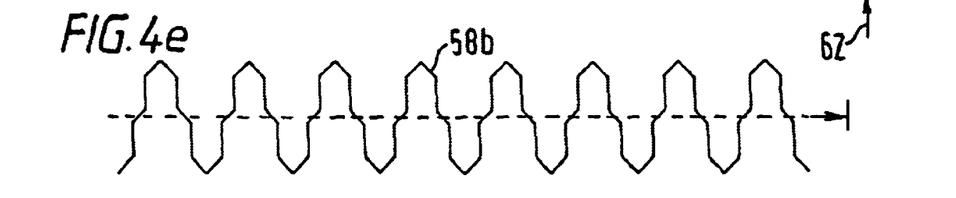

The shape of the conductors has been chosen to maximise the purity of the spatial sine wave distribution of field sensitivity (or alternatively, detection sensitivity, where the conductors are used to detect magnetic field) along the length of the substrate 21 (ie in the X direction). The track pattern has also been chosen so that there is a relatively large angle (in this embodiment approximately 90 degrees) between the wires at their crossover points. In order to avoid wires which overlap over a long distance, the angle between the wires at their cross over points should be between 30 degrees and 150 degrees. If this angle is outside this range then the wires will cross over a relatively long distance and if they move then the actual crossing point will be shifted considerably (in terms of the period of the track).

In this embodiment, four separate wires 56a, 56b, 58a and 58b, are used to create the track pattern shown in FIG. 4a. FIGS. 4b to 4e illustrate the form that these four wires take. The bonding head lays each wire in turn and connects the wires shown in FIGS. 4b and 4c at one end, to form a sin emitting/detecting coil and connects the wires shown in FIGS. 4d and 4e at one end, to form the quadrature cos emitting/detecting coil. Typically, if the track is to be used to generate a magnetic field, then it is more usual to employ a single emitting coil, so that, for example, the wires shown in FIGS. 4d and 4e would be omitted. On the other hand, if the track is to be used to detect magnetic field, then all four of the wires would usually be used to provide the sin/cos detector pair. If the track is to be used in a position encoder of the type described in WO95/31696, then a further set of parallel wires would be provided around the periphery of the wires shown in FIG. 4a for use as an excitation coil for exciting the electrical resonator (not shown).

Figure 4F:
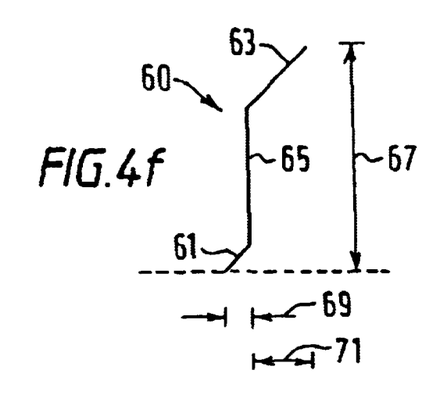
FIG. 4f illustrates the form of a basic repeating element which forms part of each of the wires shown in FIGS. 4b to 4e.

FIG. 4f illustrates the basic repeating element 60 which makes up each of the wires shown in FIGS. 4b to 4e. As shown, the repeating element 60 comprises two portions 61 and 63 which, in this embodiment, are inclined to the horizontal by approximately 45 degrees and connected together by a vertical portion 65. The overall height 67 of the repeating element 60 is 0.25 inches (6.5 mm). The horizontal extent 69 of component 61 is approximately 0.015 inches (0.4 mm) and the horizontal extent 71 of component 63 is approximately 0.035 inches (0.9 mm). As those skilled in the art will appreciate, using this basic repeating element to form each of the wires shown in FIGS. 4b to 4e, facilitates the laying of the wires by the wire bonding head 3, because the pattern is made up of a number of straight line portions and when the wires cross they do so at approximately 90 degrees.

In this embodiment, the diameter of the wire 23 is 0.2 mm. This is a design choice and is a compromise between wire placement accuracy, manufacturability and resistance. In particular, for wire placement accuracy and manufacturability, the smaller the wire diameter is the better since it is easier to bend a thinner wire to form the required shape of track then it is to bend a thicker one. Indeed, if the wire is too thick then it might not be possible to bend the wire to achieve the required track period (which is related to the required resolution of the track). However, as the diameter of the wire decreases, the resistance of the track increases resulting in the problems described above with reference to the screen printed conductive ink tracks. The diameter of 0.2 mm for this embodiment was chosen because it is a compromise between placement accuracy and resistance and because it is an optimum thickness for ultrasonic bonding. However, depending on the length of transducer used and the required performance, wires having a diameter between 0.1 mm and 0.5 mm could be used.

Figure 5:
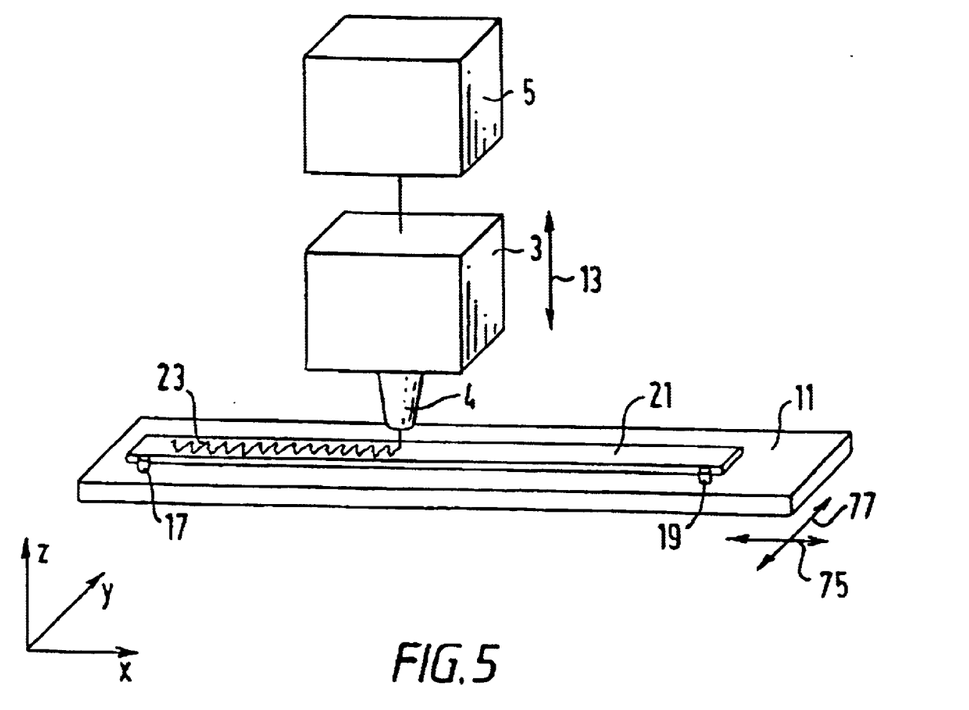
FIG. 5 schematically illustrates a second apparatus which uses wire bonding technology for laying conductive tracks on a substrate for use in a position sensor.

In the above first embodiment, the wire dispenser and tensioning unit 5 and the bonding head 3 were movable in the X and Y directions and the bonding head 3 was movable in the z direction. FIG. 5 shows an alternative embodiment in which the machine bed 11 is movable in the X and Y directions, as represented by double headed arrows 75 and 77 respectively, and the bonding head 3 is movable in the Z direction, as represented by double headed arrow 13. The supporting frame for the wire dispenser and tensioning unit 5 and the wire bonding head 3 is not shown in FIG. 5 for clarity. As those skilled in the art will appreciate, in order to accurately place the wire on the substrate 21, a control circuit (not shown) is required in order to coordinate the movement of the bonding head 3 in the Z direction and the movement of the machine bed 11 in the X and the Y direction in order to lay the desired track pattern. In the first embodiment, however, the tip 4 of the bonding head 3 could rotate about its longitudinal axis. In this embodiment the tip 4 is fixed relative to the bonding head 3 but is circularly symmetrical so that the wire can be fed from the tip 4 onto the substrate from any direction. Except for the features described above, the general operation of this embodiment is the same as that of the first embodiment and will not be described again.

Figure 6:
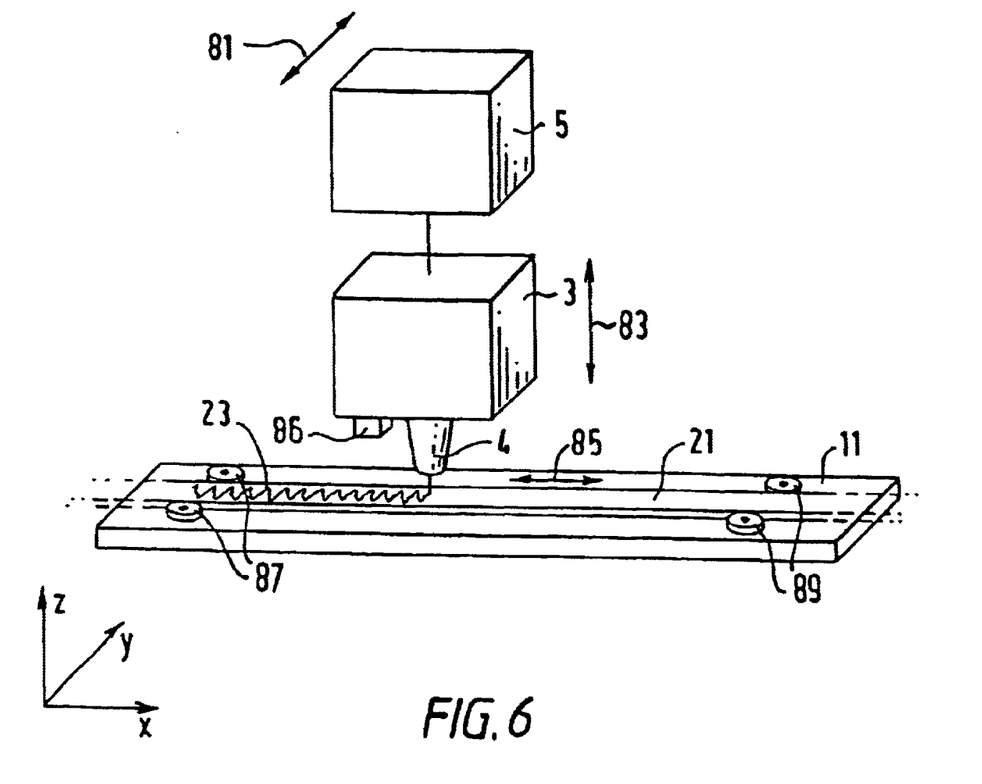
FIG. 6 schematically illustrates a third apparatus which uses wire bonding technology for laying conductive tracks on a substrate for use in a position sensor.

FIG. 6 schematically illustrates a third embodiment, for use in manufacturing very long length transducers (e.g. >2 m). In particular, in the embodiment shown in FIG. 6, the machine bed 11 is fixed, the bonding head 3 is movable in the Y and the Z direction, as represented by double headed arrows 81 and 83 respectively and the substrate 21 is movable in the X direction, as represented by double headed arrow 85. In this embodiment, the substrate 21 is moved by two sets of pinch rollers 87 and 89 located at opposite ends of the machine bed 11. In this embodiment, the rollers 87 and 89 are controlled together with the movement of the bonding head 3 so that the required track pattern is laid. The movement of the substrate may be arranged so that the laying of the tracks is carried out in a step and repeat process, whereby, for example, a 2 m section is manufactured, then the substrate is moved exactly 2 m and the process repeated. In this case, since there is usually more than one wire to be laid, either multiple bonding heads could be used or the step and repeat process could be repeated for each wire. Alternatively, the process could be a continuous one in which the substrate 21 is moved through the machine in the X direction while the bonding head or heads are moved in the Y direction in order to place the wire or wires.

As those skilled in the art will appreciate, in this embodiment, accurate positioning and movement of the substrate 21 in the X direction is necessary. This can be achieved by using accurate rotary encoders to control the rotation of the pinch rollers 87 and 89. Alternatively, the movement of the substrate through the machine could be controlled by measuring the position of known features on the substrate 21 as it moves through the machine. For example, an electronic camera 86 could be used to optically track the position of the wires which have just been laid on the substrate, and with appropriate feature recognition software accurate position control can be achieved. Alternatively, instead of using an electronic camera, the position of the wires on the substrate could be measured inductively. Alternatively still, an additional scale such as a DC magnetic scale or an optical scale could be placed on the substrate and detected with an appropriate detector, in order to control the movement of the substrate 21 through the machine. For example, an ink jet or a bubble jet printer could be provided to print marks on the substrate 21 as it passes through the machine and an optical reader could detect the marks and control the operation of the pinch rollers 87 and 89 accordingly. In such an embodiment, the ink marks may be printed on the substrate prior to processing instead of during the manufacturing process.

In this embodiment, since an almost infinite length transducer can be manufactured, the substrate 21 is preferably flexible, so that it can be coiled up for ease of transportation and storage. Such a substrate could have a form similar to that shown in FIG. 3, except in place of the 5 mm thick steel substrate, a thin (e.g. 0.3 mm thick) spring steel base could be used. Spring steel has the advantage of having substantial linear stability when made flat after being coiled up. If, however, mechanical stability is not essential, then the metal base layer can be omitted or replaced with a plastic layer.

The above embodiments have been described in order to allow the reader to more fully understand the present invention. A number of modifications can be made to the above embodiments. Some of these modifications will now be described.

In the above embodiments, the bonding head and/or the machine bed moved in the X and Y directions. In an alternative embodiment, both the machine bed and the bonding head could move in these directions (and the Z direction as well). All that is necessary is that there is relative movement between the two, so that the required pattern of wire can be laid on the substrate.

In the above embodiments, a single bonding head was provided for bonding the wire onto the substrate. In an alternative embodiment, two or more bonding heads could be provided for bonding separate wires onto the substrate 21. In such an alternative embodiment, the bonding heads could be fixed relative to each other but are preferably independent of each other, so that a greater diversity of wire patterns can be more easily generated.

In the above embodiments, ultrasonic bonding was used to bond the wire to the substrate. Other bonding techniques could be used, such as heat bonding or glue bonding.

Where heat bonding is used, a thermoplastic substrate material would be provided having a melting temperature of typically about 140° C. In such an embodiment, the wire would be heated locally by the bonding head as it is positioned, so that it locally heats the thermoplastic substrate so that the plastic melts and bonds to the wire when it sets solid.

Alternatively, glue could be used to bond the wires to the substrate. In this case, the glue could be applied to the wire before it is positioned or as the wire is positioned on the substrate, it is bonded to the substrate by curing the glue by application of heat, pressure or UV light to the glue. Similarly, the glue could be placed on the substrate initially and cured as the wire is positioned on the substrate, by the same means.

Figure 7:
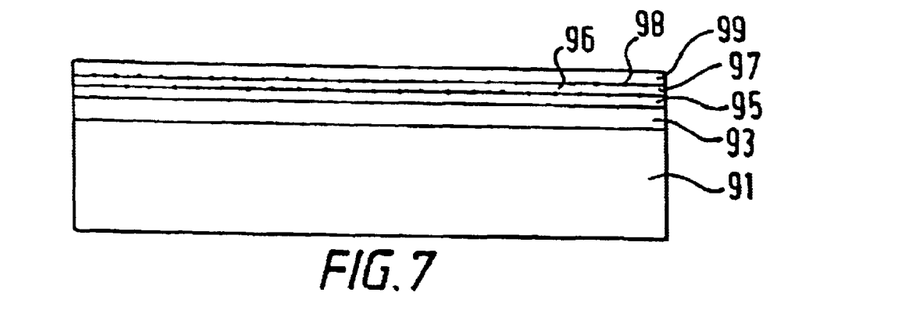
FIG. 7 shows a cross-sectional view of part of a position sensor employing two layers of wire bonded conductors.

In the above embodiments, a single layer of wires was bonded onto the substrate and then covered by a protective layer. However, it is sometimes necessary to provide a number of different conductor sets, for example two different pitches of magnetic field sensing tracks for absolute position sensing (using a Vernier technique). These tracks can be placed side by side. However, this occupies unnecessary width. The wire bonding manufacturing technique discussed above can be adapted to provide a multi-layered transducer. FIG. 7 illustrates a two-layer embodiment. As shown, the substrate has a base layer 91 which is provided for mechanical stability. A layer 93 of ferrite loaded plastic is provided on the base layer 91 and a bonding layer 95 is provided on top of it. The first layer of wires 96 is then bonded on to the first bonding layer 95. An insulating spacer layer 97 is then provided on top of the first layer of wires 96 in order to provide a flat surface for receiving the second layer of wires 98. Finally, a protective layer 99 is provided on top of the top layer of wires 98 to provide protection and to further secure the second layer of wires 98 in place. Preferably, the layer 97 is planarised by the application of heat and pressure. Alternatively, a new flat plastic layer can be laminated on the first set of wires 96 with glue.

In the above embodiments, the bonding material (for example the PVC layer 49) was provided on the substrate. As those skilled in the art will appreciate, this is not essential. For example, the bonding material could be provided on the wire.

In the above embodiments, the bonding head laid the wire on the substrate and carried out the bonding operation. This is not essential. A separate bonding device could be used to bond the wire onto the substrate as it is being laid on the substrate or even after it has been laid in the desired pattern. However, the latter is not preferred because the wire is likely to move before it is bonded to the substrate.

In the above embodiments, the track manufactured was for use in a linear position detector. The method of laying the tracks could also be used to manufacture a transducer for use in rotary or radial position detectors. In such a rotary embodiment, a rotatable machine bed may be provided. Additionally, the method can also be used to make a transducer for use in an X-Y position detector, such as a digitising tablet. In such an embodiment, the tracks laid for the X direction would be laid on a first layer and those for the Y direction would be laid on a second layer on top of the first layer, or vice versa.

In the first embodiment, a repetitive pattern of alternate sense coils was laid on the substrate, with the period between repetitions being approximately 5 mm. As those skilled in the art will appreciate, the wire bonding technique described above can be used to lay tracks of various different periods. However, as the period of the track is reduced, the resulting sensor becomes less immune to variations in the gap between the two moveable members. This is because as the period of the track reduces, the rate of magnetic field fall-off with distance from the track increases. Therefore, when designing the transducer track, consideration should be given to the desired working gap between the two moveable members.

In the above embodiments, the pattern of wires was formed using a number of straight line portions of wire. The design of the wires in this way was in order to facilitate the manufacture using the wire bonding head. However, more complex patterns of wires which continuously vary, e.g. sinusoidally, could be manufactured using this wire bonding technology. In such an embodiment, the wire is preferably continuously bonded to the substrate as it is being laid, since without continuous bonding, the wire would tend to form straight line portions between adjacent bonding points.

One advantage of the wire bonding technique described above over the PCB technique is that the mass of copper per unit volume can be made larger. This results in larger output signal levels where the tracks are used for detecting magnetic field or larger generated fields per amp of driving current where the tracks are used for generating magnetic fields. Additionally, when used to make a resonator, this also results in higher Q-factors and hence higher performance.

What is claimed is:

1. A method of manufacturing a transducer having a substrate and a continuous conductor fixed to the substrate in three or more locations in a predetermined pattern, the conductor being for use in sensing or generating magnetic fields in a position detector, the method comprising the steps of:
   providing a wire laying device for controllably laying a wire onto the substrate;
   laying a continuous wire on the substrate to form said predetermined pattern of conductor on the substrate, using the laying device, by causing the relative movement between the laying device and the substrate; and
   bonding the continuous wire to the substrate at three or more locations as it is laid on said substrate.

2. A method according to claim 1, wherein said bonding step bonds said continuous wire to said substrate at three or more discrete locations along the length of the wire.

3. A method according to claim 1, wherein said bonding step bonds said continuous wire to said substrate substantially along the entire length of the wire.

4. A method according to claim 1, wherein said laying step lays said pattern of wire on said substrate, which pattern of wire is more than 0.6 m long.

5. A method according to claim 1, wherein said bonding step uses said laying device to bond the wire to the substrate at said three or more locations.

6. A method according to claim 1, wherein said bonding step comprises the step of changing the physical state of a bonding material from a liquid to a solid.

7. A method according to claim 6, further comprising the step of changing the state of said bonding material from a solid to a liquid prior to changing the state of the bonding material from a liquid to a solid.

8. A method according to claim 7, wherein the physical state of said bonding material is changed from a solid state into a liquid state by applying energy to it.

9. A method according to claim 6, wherein said bonding material is initially provided on said substrate or on said wire.

10. A method according to claim 1, wherein said bonding step comprises the step of applying at least one of: ultrasonic energy, heat energy and UV energy to the wire and/or to the substrate.

11. A method according to claim 1, wherein said laying step moves said laying device or said substrate.

12. A method according to claim 1, wherein said laying device has an outlet through which said wire passes during the laying of the wire on the substrate, and wherein said laying step is operable to rotate said outlet in dependence upon said predetermined pattern so that the direction of wire placement on said substrate is constant.

13. A method according to claim 1, wherein said predetermined pattern of conductor is a repetitive pattern of conductor which is continuously laid on the substrate.

14. A method according to claim 13, wherein said substrate is flexible, and wherein the method further comprises the step of coiling the part of the substrate which has already received the pattern of continuous wire.

15. A method according to claim 1, wherein said laying step is operable to lay said predetermined pattern of conductor along a linear path.

16. A method according to claim 15, said substrate being elongated and having a longitudinal axis, and wherein said laying step is operable to move said substrate along said longitudinal axis of said substrate.

17. A method according to claim 16, wherein said laying step is operable to move said substrate along said axis in predetermined discrete amounts.

18. A method according to claim 16, wherein said laying step uses pinch rollers to move said substrate along said axis.

19. A method according to claim 1, further comprising the steps of sensing the relative position of said substrate and said laying device and controlling the laying step using the sensed position.

20. A method according to claim 19, wherein said sensing step monitors features on said substrate.

21. A method according to claim 19, wherein said sensing step monitors the position of wire already laid on said substrate.

22. A method according to claim 19, further comprising the step of printing features on the substrate and wherein said sensing step monitors said printed features.

23. A method according to claim 22, wherein said printing step prints said features as the wire is being laid.

24. A method according to claim 22, wherein said printing step uses an ink jet or a bubble jet type printer.

25. A method according to claim 24, wherein said printer is located in the vicinity of said laying device.

26. A method according to claim 16, wherein said predetermined pattern of conductor is laid along a continuous path which is more than 2 m long.

27. A method according to claim 1, wherein said predetermined pattern of conductor is laid over a continuous path which is more than 0.6 m long.

28. A method according to claim 1, wherein said predetermined pattern of conductor is such that the resulting transducer is suitable for use in sensing position in an X, Y digitising tablet.

29. A method according to claim 1, wherein said laying step is operable to lay said predetermined pattern of conductor in a circular path.

30. A method according to claim 1, further comprising the steps of laying a protective layer over the wires after they have been bonded onto the substrate.

31. A method according to claim 30, further comprising the steps of laying and bonding a further pattern of wires onto the protective layer.

32. A method according to claim 1, wherein said laying device is operable to lay wire having a diameter in the range of 0.1 mm to 0.5 mm.

33. A method according to claim 1, wherein said laying device is operable to lay wire having a diameter of approximately 0.2 mm.

34. A method according to claim 1, wherein said providing step provides a plurality of laying devices each for laying a respective wire on said substrate, and wherein said laying step lays said plurality of wires on said substrate at the same time.

35. A method of manufacturing a transducer having a substrate and a continuous conductor fixed to the substrate in a predetermined pattern, the conductor being for use in sensing or generating magnetic fields in a position detector, the method comprising the steps of:

providing a wire laying device for controllably laying a wire onto the substrate;

causing the laying device to lay a continuous wire on the substrate to form said predetermined pattern of conductor on the substrate, by (i) sensing the current position of the wire laying device relative to the substrate; (ii) comparing said current position with an expected position derived from said predetermined pattern; and (iii) controlling the relative movement between said wire laying device and said substrate in dependence upon the result of said comparison step to cause said continuous wire to be laid on said substrate as said predetermined pattern of conductor; and bonding the continuous wire to the substrate at three or more locations to form the transducer.

36. A method according to claim 35, wherein said bonding step bonds the wire to the substrate as it is being laid on the substrate.

37. A method of manufacturing a transducer having a substrate and a continuous conductor fixed to the substrate in a predetermined pattern, the conductor being for use in sensing or generating magnetic fields in a position detector, the method comprising the steps of:

providing a wire laying device for controllably laying a wire onto a softenable substrate; and bonding a continuous wire on the substrate at three or more locations to form said predetermined pattern of conductor on the substrate by:
  (i) causing the relative movement between the laying device and the substrate in order to locate the laying device at a first predetermined location on the substrate, determined in dependence upon said predetermined pattern;
  (ii) using the laying device to hold the wire against the substrate at the first predetermined location;
  (iii) bonding the wire to the substrate at said first predetermined location by temporarily softening the substrate at said first predetermined location by applying energy in the vicinity of said first predetermined location, so that when the substrate hardens it bonds to the wire;
  (iv) repeating steps (i), (ii) and (iii) for at least two subsequent predetermined locations on the substrate, determined in dependence upon said predetermined pattern until said wire has been bonded on the substrate at three or more locations to form said predetermined pattern of conductor.

* * * * *